US009699032B2

(12) United States Patent
Niestemski et al.

(10) Patent No.: US 9,699,032 B2
(45) Date of Patent: Jul. 4, 2017

(54) STORAGE AREA NETWORK QUEUE DEPTH PROFILER

(71) Applicant: Virtual Instruments Corporation, San Jose, CA (US)

(72) Inventors: Francis Niestemski, Mountain View, CA (US); Nicholas York, San Ramon, CA (US)

(73) Assignee: Virtual Instruments Corporation, San Jose, CA (US)

( * ) Notice: Subject to any disclaimer, the term of this patent is extended or adjusted under 35 U.S.C. 154(b) by 158 days.

(21) Appl. No.: 14/065,834

(22) Filed: Oct. 29, 2013

(65) Prior Publication Data

US 2015/0120907 A1 Apr. 30, 2015

(51) Int. Cl.
*G06F 15/173* (2006.01)
*H04L 12/24* (2006.01)
*H04L 29/08* (2006.01)
*H04L 12/26* (2006.01)

(52) U.S. Cl.
CPC ........ *H04L 41/0883* (2013.01); *H04L 41/142* (2013.01); *H04L 67/1097* (2013.01); *H04L 41/083* (2013.01); *H04L 43/045* (2013.01)

(58) Field of Classification Search
CPC .............................. H04L 41/14; H04L 43/0876
See application file for complete search history.

(56) References Cited

U.S. PATENT DOCUMENTS

| | | | |
|---|---|---|---|
| 2003/0086425 A1* | 5/2003 | Bearden et al. | 370/392 |
| 2003/0196141 A1* | 10/2003 | Shaw | 714/27 |
| 2004/0194095 A1* | 9/2004 | Lumb et al. | 718/100 |
| 2009/0259749 A1* | 10/2009 | Barrett et al. | 709/224 |
| 2011/0093253 A1* | 4/2011 | Kraft et al. | 703/21 |
| 2012/0233294 A1* | 9/2012 | Bhatti et al. | 709/219 |
| 2013/0318283 A1* | 11/2013 | Small et al. | 711/103 |

* cited by examiner

*Primary Examiner* — Vivek Srivastava
*Assistant Examiner* — Nicholas Celani
(74) *Attorney, Agent, or Firm* — Lowenstein Sandler LLP

(57) ABSTRACT

A system for improving performance of a network includes a monitor that obtains data sets corresponding to network performance, infers characteristics from the data set and generates visualizations and recommendations. In one aspect, the network is a storage area network and the system generates a box plot showing response time based on inferred queue depth, and recommending a queue depth setting if possible.

6 Claims, 10 Drawing Sheets

400

801

800

STORAGE AREA NETWORK QUEUE DEPTH PROFILER

FIELD

This disclosure is related generally to data networks, and specifically to management of processing loads for systems using Storage Area Networks.

BACKGROUND

Data networks continue to evolve with ever-higher speeds and more extensive topologies. In order to improve performance of such networks and troubleshoot problems, it is well known to monitor performance of networks through various techniques.

A Storage Area Network (SAN) is a data network that allows servers to access block level data from storage devices. The storage devices usually consist of hard disk arrays or other storage devices which communicate to servers via the Small Computer System Interface (SCSI). In SAN, the idea of one server directly accessing one storage device is expanded upon so that many servers can share disk arrays through multiple connections via switches and other network hardware.

Using the standard SCSI protocol, servers send read and write requests to the storage arrays via the switches, and get sent back read and write responses which include the data requested or status of completion. Many servers can make read and write requests to one storage array and, inversely, one server can make read and write requests to many different storage arrays. The Fiber Channel (FC) protocol is a technology used for high speed optic communications in the SAN which are used to deliver the commands which are encoded in the SCSI protocol. A server's SCSI request is encapsulated and converted to the optical signal via a Host Bus Adapter (HBA), travels along the network, being forwarded by one or several switches, and is decoded by the storage device back into the SCSI form for processing.

Built into a conventional storage array is a queuing system that allows the storage array to hold multiple requests (from various sources) and prioritize them for efficiency. The increase in efficiency stems from the fact that the storage array makes reads and writes from different physical regions on a physical hard drive. Every time the array needs to make a read from a different area of the physical hard disk, physically repositioning the read/write head is required. This takes a certain amount of time for movement and stabilization. If every read or write is done serially and in a different location, the movement and stabilization time delay is between every individual read/write job. On the other hand, if a large queue of reads and writes is held, the storage array has the ability to rearrange the reads and writes and group them by the physical hard disk location. This makes it possible to minimize repositioning of the read/write head between subsequence requests, decreasing the number of time delays. For every concurrent access against the same physical disk, the increase in efficiency decreases the service time (the time the disk is working on the request.) Decreasing the service time is generally preferable, as it allows the entire SAN network to run faster.

When a read or write request is received and placed in the queue, the queue size increases by one; every time a read or write request is processed the size of the queue decreases by one. The maximum size this queue depth can reach is called the "Target Port Queue Depth." A common value of this Target Port Queue Depth is 2048. If the Storage Array's Target Port Queue Depth is 2048 and the current target port queue size is 2048, then a subsequent request would force the storage array to bounce back the request (unprocessed and unqueued) to the server with a "QFULL" message or Task Set Full message. This tells the server that request will not be fulfilled and the server is forced to try again the request at a later time. Any server that sends a request at that point would have the request denied and be sent a QFULL message. The Target Port Queue could have been filled by one server that sent 2048 requests or 2048 servers that sent one request each. In fact, the storage array's queue can be filled with requests from any number of servers. Since receiving QFULL messages forces an HBA to send the same request more than once and has other potentially more significant impacts depending on the implementation, filling the Target Port Queue to capacity adds to network inefficiency and typically should be avoided.

One metric that is helpful in measuring the network inefficiency is a request response time. The request response time is the service time added to the waiting time for a particular request. Whereas decreasing the service time is generally preferable, increasing or decreasing the response time needs to be evaluated on a case by case basis based on application requirements. A real time data processing system might need a very fast response time whereas a data backup might not be slowed by a very long response time (in the latter case it is the total job time that matters not the response time of an individual read/write request.)

SAN-attached servers have a connected HBA which has a built in configuration setting that can toggle its ability to queue its data requests. This queuing of data requests refers to whether the HBA allows multiple requests to the same target before a response has been received for the previous outstanding requests. Not only can the HBA be configured to allow or prohibit this feature, but also the maximum amount of unanswered requests per target and LUN can be set. This is called the maximum queue depth of the HBA or the logical unit number (LUN) queue depth. The LUN queue depth determines how many commands the HBA is willing to accept and process per Target—LUN pair. From this point in this documentation, LUN queue depth, maximum queue depth and queue depth will be used interchangeably, all referring to the same setting. A maximum queue depth of one means that one request outstanding is the maximum amount of queue available (this is the equivalent to no queue). A maximum queue depth limit of two means that two outstanding requests may be made to the target before a request is responded to. When the initiator (server) receives a completed response, that request becomes answered and then only one request is outstanding. The server then can make another request increasing the queue size again (provided the new size is less than the queue depth limit maximum).

The target queue depth and LUN queue depth are variables that directly affect the service time and the response time. The service time and response time are inversely proportional, i.e. lowering the service time raises the response time and vice-versa. To exemplify this relationship consider that as a server sends more jobs simultaneously the queue of the storage array will eventually grow to the point that the array cannot handle the requests as they received. This enlargement of the storage array queue will lower the service time as discussed for the storage array globally. The server, though, will experience a larger response time for each request because there are potentially other requests being serviced by the disk first. Even though the individual requests are being satisfied by disk faster, there are more items in the queue waiting to be serviced.

The disk service queue is not FIFO (first-in, first-out); the command order may be optimized to improve service times. For example, consider the case where the server sends 5 read requests that reside on the same physical spindle, denoted as A, B, C, and D & E. All of these requests will be entered in the disk's queue which subsequently decides, based on its own logic and understanding of the logical block addresses, to process B,C,D,E and A, in the very front of the storage array queue, in that exact order. The response time of B is essentially the service time and no waiting time. The response time of C is the service time plus the time waiting for B to be processed. The response time of the D is the service time plus the waiting time for B and C and so forth. The average response time is than the average of all the response times for B through A. Since A had to wait until the end of the queue, its response time is large and raises the average response time for all those jobs. Without a queue, the response time, for an otherwise empty storage array, would be just the service time. This is why the LUN queue depth acts as an optimization condition with the total effect being to lower the service time, maximize the number of requests satisfied and raise the response time. This creates a balance between the positive aspects of decreasing the service time and the potentially (sometimes but not always) negative aspect of raising the response time. Because of this the maximum queue depth limit can be thought of as a knob which can continually tune the performance of a SAN.

Not all SAN administrators have modified the maximum queue depth limit configuration on the HBA (often sufficient information is unavailable on the optimal queue depth, and so in the absence of guidance it is left at default). Those who do alter the maximum queue depth limit usually do so following an extremely simplistic mathematical approach. This simplistic approach is to say that Queue Depth Limit of an HBA should be the Target Port Queue Depth divided by the number of paths connected to the target port and further divided by the number of LUNs the host can access from that particular port:

$$QD_{LUN} = QD_{TARGET}/(Paths\ to\ Target*LUNS\ Accessible)$$

This treats all servers equally and divides up the resources equally between all servers. This might be acceptable if the network was perfectly balanced, meaning that every server had the same amount of read/write requests to every LUN, consistently at all times and, moreover, that the performance of every server was equally important. This, however, is a gross approximation. First, network traffic is rarely constant in all times, meaning as one server gets busy other servers might be totally idle. Resources reserved for idle servers are wasted. Second, different servers may be more or less important depending on the applications that the servers host. Therefore, equally distributing the resources to servers deemed less important means that resources are wasted. Third, and possibly most importantly, this simplistic method does not take into account any timing metrics (e.g., response time or service time.) Calculating available resources and dividing says nothing on how raising a particular server's queue depth limit will affect the response time of a particular server in the network. This means that the mathematic approach is unsatisfactory but, unfortunately for SAN management, has been the best option available.

A major roadblock in improving this method is that the SAN operates in many ways as a black box. The response times and the service times are neither recorded nor measured—nor is the size of the queue. This leaves guesswork as the basis for further improvements. Thus, a challenge remains as to how further improvements in SAN performance can be achieved.

Thus, challenges of network performance monitoring include minimizing the disruption to the network caused by the monitoring. Further challenges come from the complexity of issues relating to network performance and corresponding ways to manage such performance.

SUMMARY

In one embodiment, a method of improving performance characteristics of a data network includes monitoring network activity to obtain data sets, generating inferred characteristics from the data sets, analyzing the inferred characteristics to determine whether to recommend a setting, and if a recommendation is appropriate, providing the recommendation.

In one aspect, the inferred characteristics include inferred queue depth. In a related aspect, the setting is a queue depth setting.

In still another aspect, the method also includes presenting a box plot relating to the inferred characteristics. In a further aspect, a visualization including a box plot shows a recommended setting.

Corresponding systems to implement such methods are also disclosed herein.

The features and advantages described in the specification are not all inclusive, and particularly, many additional features and advantages will be apparent to one of ordinary skill in the art in view of the drawings, specification and claims herein. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

Figure 1:
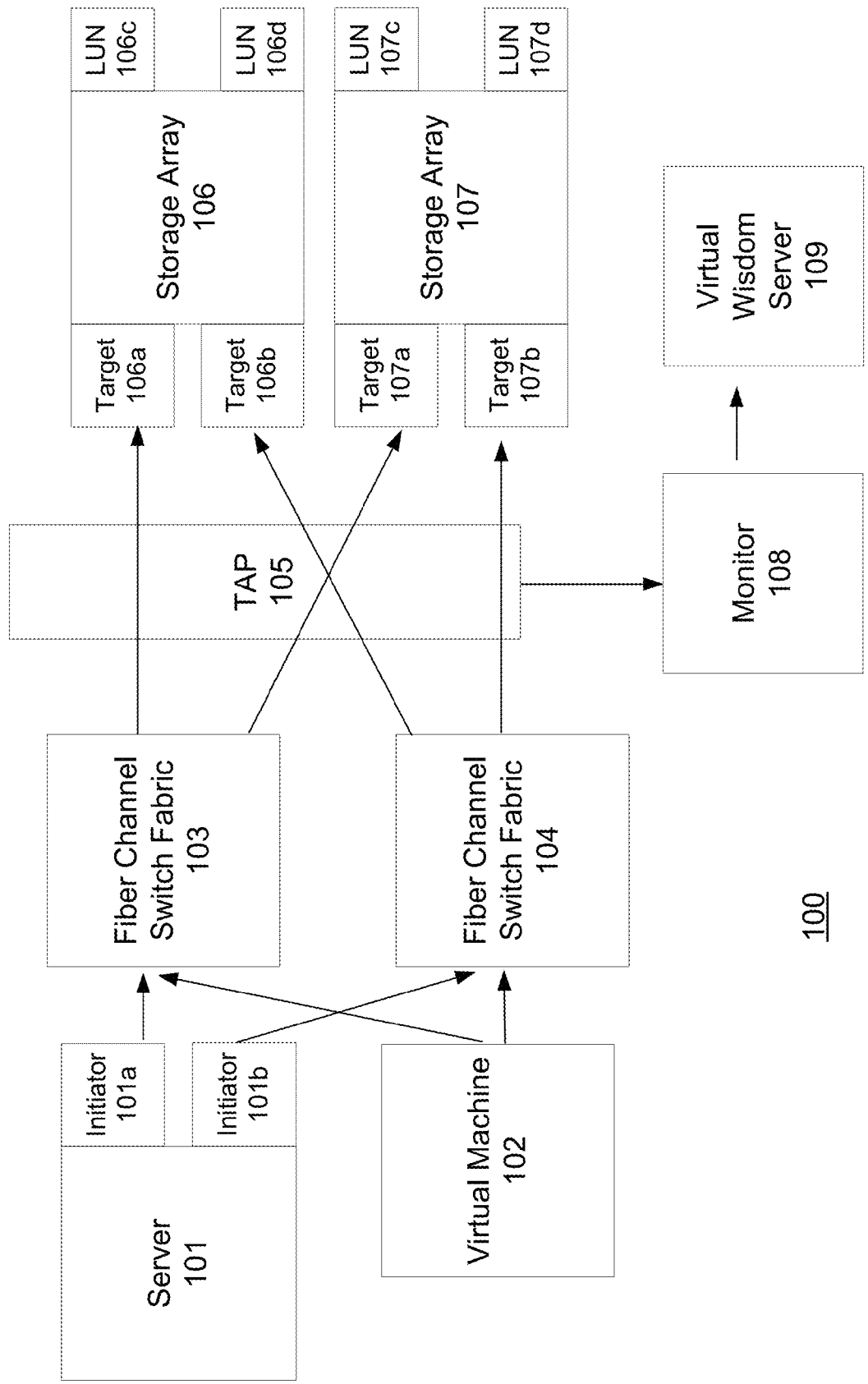
FIG. 1 is an illustration of a network according to one embodiment.

An embodiment is now described with reference to the figures where like reference numbers indicate identical or functionally similar elements.

Before turning attention to the figures, the following discussion provides context for the various embodiments detailed below. The described monitoring system infers what queue depth settings would correspond with various response times, without being disruptive in any way to the current operation of the SAN being monitored.

If a SAN were not in active service (which is rarely the case with enterprise SANs), one can imagine a disruptive way to choose a queue depth setting, provided still that the SAN had some measurement system to record the relevant metrics. The first step in such a disruptive method would simply be to change the LUN Queue Depth setting to 1. Those skilled in the art will recognize that modifying the LUN Queue Depth setting requires a server shutdown and reboot, which is one of the main reasons this method would be disruptive. "On the fly" LUN Queue Depth limit changing does not exist for most operating environments. Response time metrics would be recorded for a fixed period of time and analyzed. The next step would be to raise the queue depth limit setting to 2 and repeat the whole process for all possible queue depth settings.

This disruptive solution would have a number of shortcomings. One is that checking 32 or 64 possible queue depth settings would require 32 or 64 server reboots. Typically, business SAN environments try to avoid any reboots and limit system down time as much as possible, so this method would not be suitable for production use. Another shortcoming of this plan is that the traffic would have to be exactly the same for each setting of the LUN queue depth or the experiment would give biased and inaccurate results. This bias could be decreased by taking long time averages but in such case (say, if a day of recording time was used), checking 64 configurations would take two months of data taking Even if one was to only check a few configurations it would still mean several reboots and several days of data taking per server, as well as a lengthy analysis—all resulting in a time-consuming, costly and disruptive procedure.

The embodiments detailed below provide a significant improvement over this hypothetical disruptive, time consuming and inaccurate example. Rather than requiring reboots and checking each configuration, the embodiments below bin the times into segments and in each time segment find the minimum the HBA queue size has been, followed by the respective maximum and mean. The bin size of timing is relatively small, so for a reasonable amount of time (from a couple hours on), the data set begins to get populated with the response times and the queue sizes over time. This data gets aggregated, analyzed, curve fitted and finally the output is made. Some advantages of this approach are:

1) The data collection is non-perturbative and in the background. It results in no disruption of the SAN, which means no interruption of the business the SAN is responsible for.
2) The data is aggregated and displayed in a manner that it makes it viewable and informative. This is opposed to the raw data which is sufficiently noisy that trends are not able to be inferred by eye.
3) The automatic recommendation requires no user analysis. The entire process takes less than one minute per recommendation in some embodiments and can be programmatically performed in the background, only notifying the user of specific optimization recommendations.

To aid in the quick processing and meaningful utilization, embodiments discussed below make use of a box plot implementation that is compatible for use in "big data" systems. A box plot is a type of graph for visualization of a data set that shows, among other things, multiple percentile results, typically with a "box" defined by two percentiles (e.g., $25^{th}$ and $75^{th}$), the box is intersected by a horizontal line demarcating the median ($50^{th}$ percentile), and "whiskers" showing outlier values (e.g., minimum/maximum values or $2^{nd}$ and $98^{th}$ percentile values). The box plot approach described herein avoids the use of sorting (which is usually essential to a traditional box plot algorithm) to make such systems amenable to distributed computing and map-reduce schemes. In order to exclude sorting from the algorithm, approximations are made such that the solution does not represent the exact solution as would be given by the standard implementation, but rather a solution which can approach the correct solution to an arbitrary degree of precision set by the computation time. For larger data sets the precision can be decreased, and for smaller data sets the precision can be increased, with the computation time per point being lowered and raised, respectively. With the precision optimally set, the algorithm performs substantially faster calculations with less memory requirements than otherwise would be possible.

Further, the implementations discussed below focus on not only improved speed but also on removing invalid data to improve overall shape correctness, as well as implementing algorithms for visual balance/appeal in choosing how many columns to present.

More specifically, an invalid data filter addresses how best to represent categories of data in which the count of that data is not known, as it is desirable in certain circumstances not to weigh or influence the chart based on the data count per category. However, this may make it difficult to view invalid data in such a plot. For example if a completed box plot has five categories describing some testing scores for children in grades 1-5 it is certainly correct that there is no reason to weight grade 4 over grade 3 even if that grade has more children in it. On the other hand what if there is a recording error and grades 1, 2, 3, 5 all have 1 million records each and grade 4 has only 100 records (for whatever reason), grade 4 might need to be removed because the confidence level that the result of grade 4 is accurate might not be high. This lack of confidence would be directly due to the fact that the amount of data is not large enough provide helpful statistics. If the distribution of the counts of the categories was uniform, removing these invalid columns would be easily implemented with fixed threshold values. In this case, however, the algorithm is made to be general so no assumption is made about the distribution, be it Gaussian, exponential or any arbitrary distribution. Regardless of the distribution the filter can still find invalid columns and remove them.

As to visual appeal, since many times the more traditional box-plot is categorical and labeled with worded categories e.g. "Spring", "Winter", "Fall", "Summer" the size of the plot (measured in columns) is naturally constrained by the amount of categories one chooses to type in. With numerical data on both the x and y axes that is divided into bins, the potential for a large number of columns exists (large in the sense of too big to fit on a page, not in the sense of the amount of data in terms of the big data limit). From a visual perspective seeing too many columns might not be helpful to the end user and might make the information displayed awkward and hard to understand. Also, with too many columns, the potential exists for the variation from column to column to visually skew the overall pattern the box-plot is meant to elucidate. Because of this, an algorithm is employed to ensure the visual balance. The algorithm polls how many columns would be produced by the box plot and, if it is determined to be too many to be visually balanced, it combines the columns in a particular manner detailed below. The final decision of what is displayed has to do with how many columns fit on the page size such that the page does not look cluttered and optimized against maximizing the number of columns to show the most variation in the finest detail. These factors are considered, with the raw number of columns, to determine how the columns could be combined such that they divide evenly.

FIG. 1 is a high level diagram of a monitored storage area network 100. The network 100 includes at least source device, e.g., server 101 and virtual machine 102, providing a request to store data in one or more storage arrays, e.g., 106, 107. Note that while the prior sentence described server 101 and virtual machine 102 as source devices, they are source devices when sending data to storage but destination devices when requesting data from storage. Thus, reference to "source device" herein should be taken to include a device such as server 101 that could be either a source or a destination device, and storage arrays 106, 107, should be understood to be either destination devices (for storage of data) or source devices (for retrieval of data).

Typically, communications between, say, server 101 (with its initiators 101a, 101b) and storage array 106 (with its targets 106a and 106b as well as its LUNs 106c and 106d) are routed via fiber channel switch fabric devices, e.g., 103, 104. Network 100 further includes a traffic access point (TAP) 105 that is inserted between source devices (e.g., server 101 and virtual machine 102) and storage devices (e.g., 106, 107), and divert at least a portion of the signals among those devices in order to provide a monitoring signal used as described below. As shown in FIG. 1, the TAP provides such signal to a monitor subsystem 108. In the embodiments discussed herein, much of the network communications is provided via optical signals traveling on optical fibers and converted to electrical signals at various devices (e.g., storage array 106, monitor 108). A TAP 105 operates by diverting a portion of the transmitted light headed, e.g., to storage arrays 106, 107 to an additional optical fiber connected to monitor 108, thus allowing monitoring of signals without disruption of the SAN's operation.

In one embodiment, the VirtualWisdom SAN Performance Probe provided by Virtual Instruments Corporation of San Jose, Calif. is used to implement monitor 108. Monitor 108 can then perform protocol analysis summarize performance characteristics of the transmission that occurred along that fiber. This characterization of the observed transmission stream is then forwarded over a local area network on a periodic basis to a server, referred to as VirtualWisdom Server 109, further discussed below, and stored there in an internal database.

In actual implementation, network 100 consists of many additional components, typically with tens if not thousands of source devices, destination devices and TAPS, interconnected via multimodal optical fibers capable of carrying numerous independent signals at various wavelengths in a frequency-division multiplexed manner. The components shown in FIG. 1 are thus illustrated in a simplified manner to most clearly illustrate the subject of this disclosure.

Of particular interest to the queue tuning analysis problem discussed herein is data pertaining to the observed SCSI tasks that are structured by Initiator-Target-LUN (ITL) conversation. In general terms, such data includes time-stamped metrics such as the response time information, the maximum number of pending exchanges in the time window from one time stamp to the following time stamp, and the minimum and average number of pending exchanges for that same time window. Since the data is recorded by ITL, all of the conversations belonging to a given server (e.g., server 101 of FIG. 1) are encompassed by including all conversations involving individual initators (101a, 101b) belonging to that server. In one embodiment, the specific metrics of interest are (with descriptions):

Average Read Exchange Completion Time: The average amount of elapsed time (in milliseconds) for any SCSI read command (Exchange) that completed in the given interval, from initial command to final status. Measured and reported per Initiator-Target-LUN.

Average Write Exchange Completion Time: The average amount of elapsed time (in milliseconds) for any SCSI write command (Exchange) that completed in the given interval, from initial command to final status. Measured and reported per Initiator-Target-LUN.

Average Write Command to 1st Data: The average delay (in milliseconds) between all SCSI write commands and the target's Transfer Ready notification back to the initiator. No data is transmitted during this time, only a request to write and acknowledgement of the request. Measured and reported per Initiator-Target-LUN.

Average Read Command to $1^{st}$ Data: The average delay (in milliseconds) between all SCSI read commands and the first data frame back from the target to the initiator. This time includes any work needed by the target to satisfy the request and all that is left is putting the response on the wire. Measured and reported per Initiator-Target-LUN.

Minimum Number of Pending Exchanges: The minimum number of exchanges that were pending (outstanding) at any time during the interval. The minimum value includes any exchanges that were opened in previous intervals that have not yet closed.

Average Number of Pending Exchanges: The average number of exchanges that were pending at any time during the interval. When a new exchange starts, the number of items in the queue is added to a counter and at the end of the interval the counter is divided through by the number of exchanges for the interval. Accordingly, this metric is really the average number of pending exchanges when the target is busy.

Maximum Number of Pending Exchanges: The maximum number of exchanges that were pending at any time during the interval. The maximum value includes any exchanges that were opened in previous intervals that have not yet closed.

Minimum Number of Pending Exchanges: The minimum number of exchanges that were pending at any time during the interval. The minimum value includes any exchanges that were opened in previous intervals that have not yet closed.

In one embodiment, a separate server known as Virtual Wisdom server 109 queries a user for input as to the time window in which this analysis should be performed, the server name on which the analysis is to be performed, specific LUNS to single out (or alternatively whether all LUNS should be considered), and an option of analyzing reading, writing or both.

Figure 2:
FIG. 2 is an illustration of a Virtual Wisdom server according to the embodiment of FIG. 1.
Figure 3:
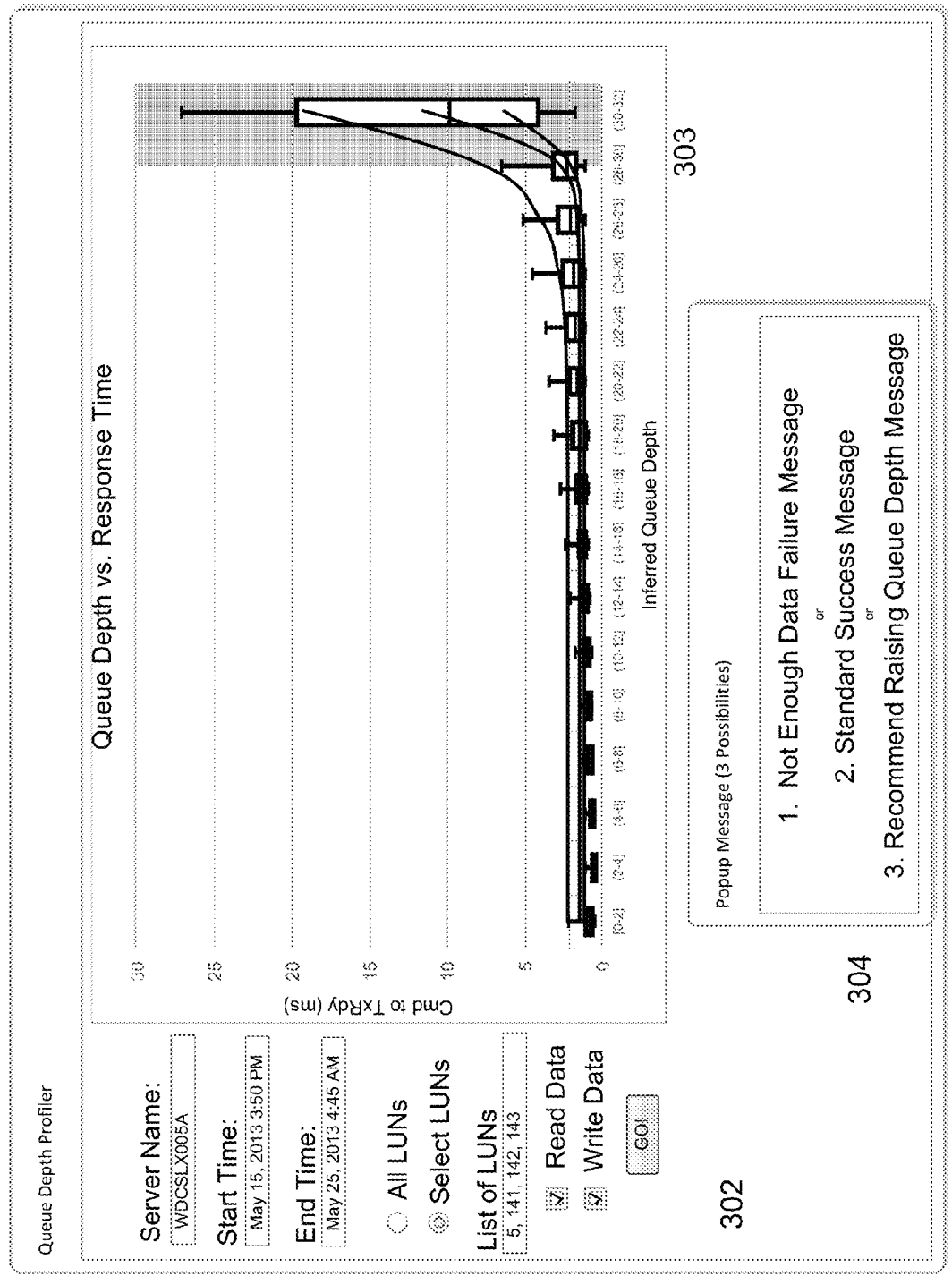
FIG. 3 is a user interface screen according to the embodiment of FIG. 1.

Referring now to FIG. 2, Virtual Wisdom Server 109 includes two subsystems to be further detailed here: a recommendation engine 121 and a UI generator 122. Recommendation engine 121 creates, as mentioned above and detailed herein, suggestions for where to set operational parameters (e.g., Queue Depth) for optimal performance. In order to generate data for the analysis that leads to such recommendation, a UI generator provides a user interface as illustrated in FIG. 3. In this embodiment, a graphical user interface (GUI) 301 includes a dialog box 302 that allows user selection of which server to analyze using the monitored data stored between the selectable start/end times, a selection of whether all LUNs are to be analyzed or only select LUNs, and whether analysis is to be for read, write, or both.

Once a user presses the "GO" button, processing starts with the selected parameters. For each timestamp that falls in selected window, the corresponding metrics are added from the database into temporary QD Profiler Data Storage in the following way:
1) The time stamp is stripped, since once a data point is entered into the QD Profiler the time in which it occurred is of no consequence.
2) Three separate 3-dimensional vectors are created with parameters (x,y, weighting). They are the data points:
 (Min Pending Exchanges, Command to 1st Data, weighting for Min Pending Exchanges)
 (Avg Pending Exchanges, Command to 1st Data, weighting for Avg Pending Exchanges)
 (Max Pending Exchanges, Command to 1st Data, weighting for Max Pending Exchanges)
The weighting in one embodiment is as follows:
WEIGHT_FOR_MAX_PENDING_EXCHANGES=3;
WEIGHT_FOR_MIN_PENDING_EXCHANGES=1;
WEIGHT_FOR_AVG_PENDING_EXCHANGES=6;
This will shape the final histogram by favoring that Avg Pending Exchange data over the Max Pending Exchange Data which, in turn, is favored over the Min Pending Exchange Data. The resultant picture is a data set that is strongly represented over the mid-range queue depth values, well represented in the highest queue depth settings and with minimal representation, for the sake of completeness of the curve, for the lower queue depth setting values. The weighting scheme is translated such that a point of the form (a,b,weight) will be recorded as (a,b) repeated weight number of times, with the aggregate of all (a,b) pairs being recorded by the 2D histogram filter algorithm outlined below.

Figure 9:
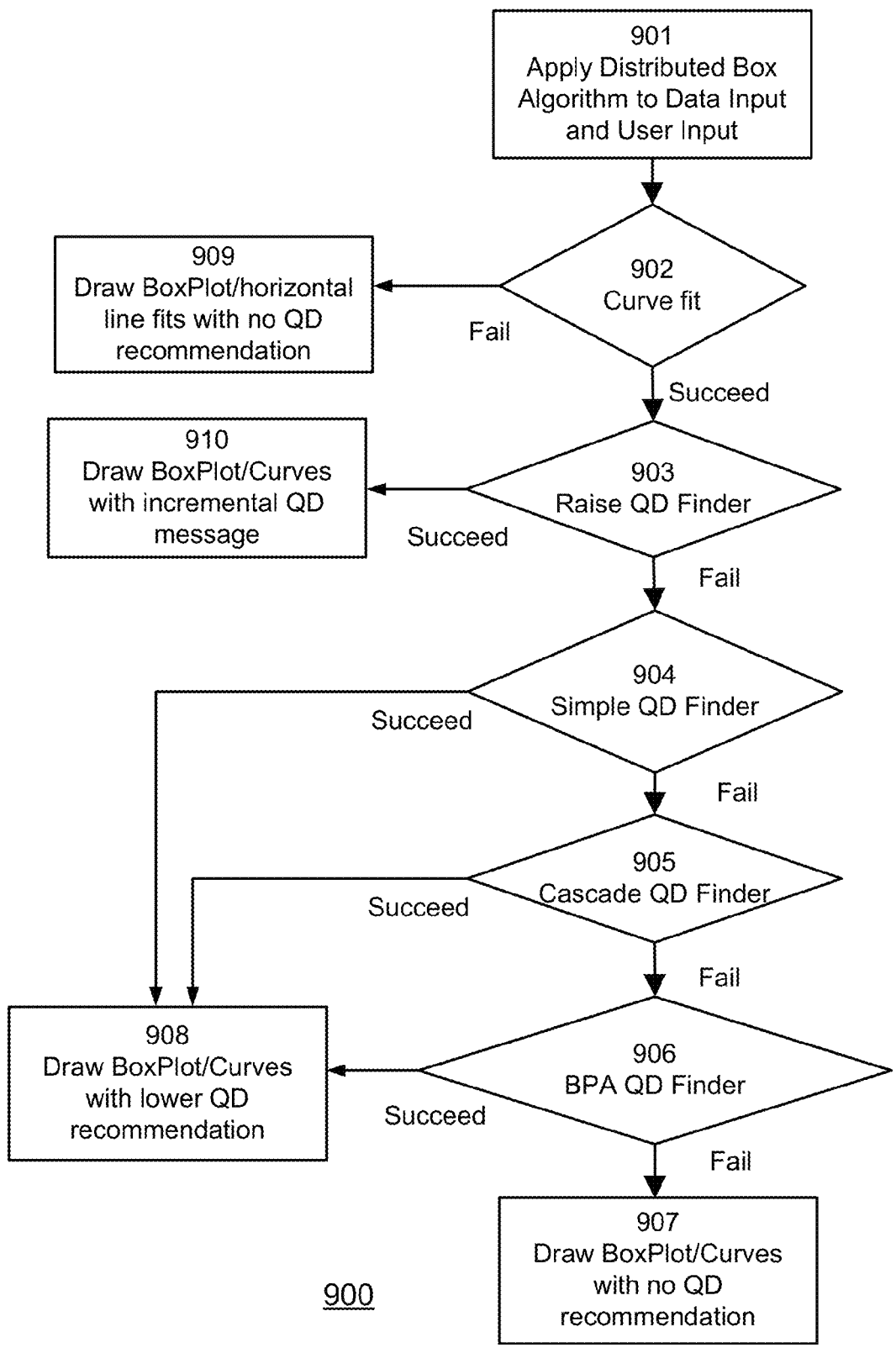
FIG. 9 is a flow diagram of monitoring processing according to the embodiment of FIG. 1.

For context, it may be helpful to refer now also to FIG. 9, which is a high level flow diagram for processing 900 of recommendation engine 121 to generate a recommendation, if possible, based on the parameters set via UI generator subsystem 122. Initially, the user-entered parameters and the data corresponding to those parameters are obtained and applied 901 to a distributed box plot process for data aggregation.

Generally speaking, three basic algorithms are used for the box plot: a 2D histogram algorithm, a 2D histogram filter algorithm, and an algorithm that creates the box plot from the 2D histogram.

More specifically, a conventional box plot is created by dividing the independent values (usually referred to as x-values) by some category. The x-axis can be non-numerical and may already be in categories by label. For each category, the data points in that category are sorted in ascending order and stored in a table (array) for lookup. Then, percentile values are determined. For example, to get the $5^{th}$ percentile, simply look at the cell in the table that is 5% of the total size of the table, since it is sorted that value in that cell is the border of the $5^{th}$ percentile of the data. The creation of the box plot is the calculation of these values for each column. The result of the calculation, for example, might look like:

Number of Columns: 5
Data:
{3,45,76,99},{13,43,45,66,99},{8,28,48,78,98},{1,41,71,91},{13,23,45,66,68},
 Labels: {"1","2","3","4","5"}

Getting to a result of this form is the focus and goal of the box plot generating algorithm. Translation of this information into the actual plot and the action of drawing the lines and squares is achieved using conventional off-the shelf charting function or plotting software.

A problem with conventional box plots is that it they not big data compatible. In order to make a box-plot of a huge amount of data, all that data would have to be stored and then sorted. In terms of big data it is ideal to be able to perform calculations that do not have to store the data, since the data size of relevant information for a typical SAN application approaches terabytes if not petabytes; physical hard drive space is typically limited and serves as a physical constraint. Also, in terms of the processing time, sorting data is slow. It is well known that stable sort algorithms perform operations of number proportional to n ln n where n is the amount of data. The time to complete the box plot is proportional to the amount of data the procedure includes in the computation. In the world of big data, the total amount of data in which one would like to perform an analytical operation on might require more than a reasonable amount of computation time. The only way then to complete the analytical operation is to throttle the amount of data included in the computation and only look at a smaller sampling of the larger data. There then exists a relationship between the size of the data sets which can be analyzed by an operation and the speed of that operation, and, as is the usual case, faster operations allow for larger data sets which ultimately leads to more accurate solutions of many statistical analyses.

One way to make an arbitrary analytical computation faster and thus capable of accommodating more data is to utilize parallel computation, which is a standard method for improving computation speed. One often-used scheme for parallel computing is the "Map Reduce" scheme where the data is chopped into smaller segments, distributed to multiple servers, a part of the operation is performed (the mapping), then a result is sent and then aggregated with other results (the reduce). The standard way to utilize map reduce is to start with some data series stored in a distributed manner over the cluster and perform the map and reduce tasks to ultimately calculate a resultant data set smaller than the input data set. Unfortunately, the straightforward way to parallelize the standard implementation of the box plot does not fit this standard. In Map Reduce language, the Mapper would be the identity mapper, the Reducer would be a single identity Reducer (each time identity meaning that the input has not been altered at all). Unfortunately, that single identity reducer's job would be to sort the entire data set (albeit piecewise coming from multiple nodes in sorted chunks) and saved as a new list. So although parallelization in compute time has been used, it has come at the cost of needing to double storage size (half for the input list and half for the sorted list). When referring to data sets of terabytes and larger, requiring double the storage to hold an entire copy of a big data set is rarely considered an acceptable solution.

There are ways around this problem, but they suffer certain challenges as well. Some work well for Gaussian data distributions but not otherwise; others have the same computational complexity or storage requirement issues as box plots.

To gain computational efficiency and lessen the stringent storage requirements of a distributed system, the algorithm applied in step 901 uses two-dimensional histograms as a starting point. Such histograms do not themselves present data in a form that is particularly helpful here, but they can be used to generate the box plots.

For purposes of explanation, consider numerical data in pairs that will be referred to as (x,y). A precision value is set, tuning the speed vs. accuracy of the upcoming algorithm. This precision value is discussed in greater detail below. The precision value is translated into an x-spacing and y-spacing for a two-dimensional histogram container to store the incoming data. Now the algorithm is ready to accept (x,y) pairs which are added to the two-dimensional histogram container. The container is implemented with a hash-table. Each time an (x,y) input pair falls into the bounds of the histogram, the count of the appropriate bin (which is determined from the spacing) is incremented by one as in a standard two-dimensional histogram. The minimum and maximum values of the bins used are recorded. Later, when this value is polled it will come back as the number of counts at the (lower boundary+upper boundary)/2. So, for a spacing of 1 for both x and y, the following sequence: (1.1,2.5), (1.6,2.7), (3.1,12.2) will come back as (1.5,2.5), (1.5,2.5), (3.5,12.5). As shown by this example, some precision is lost, but the amount is tunable to balance precision against processing overhead as well as storage.

The example above is for a single computer. This same input procedure is usable for a distributed computing framework using multiple servers. The most useful case of this might not be where one large file is split and distributed among multiple servers, but for a case where experimental readings of the same type are coming from multiple sources or stored by pieces in different locations. With this setup, the aggregation process is simple: A double for-loop iterating from the $1^{st}$ bin to the last bin (which can be calculated by offset+index*spacing, as usual, for both the x and y directions) and then adding the value read from one sever to the value read to the second server (simple matrix addition), i.e., $$M_{ij} = \sum_{n=1}^{nodes} M_{ij}^n$$

This, again, is in contrast to an aggregation scheme of having to concatenate two lists of (x,y) pairs together and then re-sort the entire list (and possible iterations, since all the nodes of the distributed system combine one at a time).

Once the histogram is created (whether aggregated from multiple nodes or created completely on a single node), a filtering process is applied. As described above the data are not weighted by the sum of the counts for all identical values of x (column counts) but, on the other hand, are discounted if there are not enough counts for all identical values of x to be confident that the box plot will be a correct and accurate reflection of the data. This is a subtle distinction. It means that the counts are only discriminated if they do not conform to the entire group while maintaining the condition that the group not be ranked in the final output.

This filtering process is undertaken before creation of the box plot boxes, and proceeds as follows:

1. Make a list of the columns of the histogram, with the count of the data points stored (the size) in each column.
2. From this list remove all columns that have a count of zero.
3. Next, there is a value called the hard threshold, which is a threshold that is described by a minimum limit where, regardless of the other counts, this column can be considered invalid. For example, if a column only has one point, the box plot will be deemed invalid, or, with two points, there would be no good definition of the median so it too should be deemed invalid. Based on the particular environment of use, this approach can be extended to invalidate data of a certain count up until a specified value where confidence is regained in that count number. In one embodiment, the value of five is used, so that below this number the histogram column is considered invalid. As with other parameters discussed herein, tuning allows for use of different numbers based on preference, environment of use, etc.
4. The next step makes the filtering process more dynamic. There is a difference between the data sets with a list of column counts as follows (10000, 10000, 10000, 6) as compared to (9, 8, 7, 6) and also as compared to (5000, 3000, 1000, 1000). The third case is a good example of data that seems all valid (relative to the counts of the other members of the set) and will all be weighted equally (as it was stated that all data gets weighted equally for these box plots). For this set, 5000 is, of course, five times as large as 1000. Despite this, it can succinctly be stated that all the values are in the same ballpark, so they all should be considered valid. A more technical mathematical definition of this similarity could be that the numbers are part of the same count distribution (as opposed to value distribution which the box plot analyzes) regardless of that distribution type. Note that in the example, the counts describe small to ultra-small data sets. This size was chosen for convenience in explanation rather than description of typical use, since this algorithm is best suited for very large data sets. That being said though, the algorithm should not fail with very small data sets either. This is part of the reason this filtering process has to be this complex. In the second example of (9, 8, 7, 6) the numbers are all in the same order of magnitude, albeit all small. Specifically, the column count of six is considered valid here because the other columns have counts very similar to this and the process is only interested in maintaining that similarity (even if these numbers are not large enough to approach the statistical limit.) The first example of the set (10000, 10000, 10000, 6) shows some count skewing. The first column in the set has a count that is not likely to be a part of the same distribution as the others. This value of 6 should be removed. In the second list, the number 6 is considered valid, but in the first list it is considered invalid; in one embodiment differentiation based on context is used to determine when to remove such a count. It is clear that more than a hard numerical threshold is needed. The dynamic process to account for this is outlined in the following steps:
5. Already established from the following steps is a list of column number and column counts; sort that list in ascending order (note that this sort is performed on the small list of counts, not the data set itself, which is quite large).

6. Find the "median" of this list; since it is sorted this can be accomplished by choosing the rank that is the next largest integer above the list size multiplied by 0.5.
7. Then, filtering from this column/count list, make anew list only including the columns with counts starting at the median downwards to 25% below the median. This is chosen to best account for an exponential distribution of counts, but could also account for many other distributions.
8. From this smaller filtered list, the mean of this data and the standard deviation is calculated in the standard way.
9. A new dynamic threshold is set equal to the median of the full list+1.5*the standard deviation of the shortened list.
10. Now, looking back to the full list, the count of each column is polled to see if that count is below the recently set dynamic threshold. If it is less than the dynamic threshold, then that column is earmarked to be set to zero.
11. Before those earmarked numbers are actually set to zero, they are compared to another hard threshold. This threshold represents the fact that even if a particular column count is much smaller than the rest of the group and is thought to be outside the distribution, that column might not be zeroed if the count is big enough such that we are sure that it falls in the statistical limit (meaning that a confidence exists that the box plot is still appropriate and correct.) This hard threshold can be 100, 1000, 10,000 etc. and this setting is dependent on the type of data that is being analyzed and set by the user.
12. Nothing will be calculated for columns with count as zero (whether it was originally zero or set to zero by filtering).

Next, filtering for visual appeal/usefulness, rather than based on mathematical validity, is undertaken. As mentioned above, this is to make sure the plot is easily understood visually and not overly confusing, so that trends and patterns are obvious. From a visual perspective, seeing too many columns might not be helpful to an end user and might make the information displayed awkward and hard to understand. Also, if the granularity of the histogram has too many columns, the variation from column to column might visually skew the overall pattern the box-plot is meant to elucidate. Because of this a sub-algorithm is employed to ensure the visual balance.

The visual balance sub-algorithm is controlled by two parameters: the MIN_BOX_PLOT_SIZE and the MAX_BOX_PLOT_SIZE, which can be altered by user preference as to what provides a good appearance on a screen. In one embodiment, MIN_BOX_PLOT_SIZE is set to 6 as a default and MAX_BOX_PLOT_SIZE is set to 20 as a default. With those parameters chosen, the balancing function can begin. If no filtering occurs, the box plot has a number of columns determined from the data and histogram x spacing; this number is referred to as the natural number of columns. The procedure for the visual filter is as follows:
  1) Check if the data set is empty and if so quit.
  2) If the natural number of columns<=MAX_PLOT_SIZE continue to make the box plot with the natural number of columns. This plot is determined to already look balanced and not have so many columns that it looks confusing.
  3) if the natural number of columns>MAX_PLOT_SIZE, reconfiguration process proceeds as follows:
    a) First it chooses the amount of columns that will look the best, given how many columns of data exist. The algorithm looks to divide the data evenly such that each column is now compressed to contain multiple columns. It may not always work out that each column that is compressed can contain the same amount of columns, but a loop checks to see if that is possible. The way it does this is by minimizing the natural columns modulo some proposed division value. The code favors column numbers closest to the MAX_PLOT_SIZE because it is better not to compress the columns if it is not necessary to maintain the constraints.

Exemplary code to implement this is as follows:

```
for (int mod_threshold = 0; mod_threshold < numColumns;
mod_threshold=mod_threshold+ (numColumns/4)){
    for (int size=max_size; size>=min_size; size--){
        for (int divideby=2; divideby <= numColumns; divideby++){
            double temp= numColumns/divideby;
            int  mod = numColumns % divideby;
            if ((temp == size) && (mod <= mod_threshold)){ return size; }
        }}}
```

4) Now that the optimal plot size has been determined, the next step is to perform the action of compressing the natural columns into fewer columns.

In one embodiment, the routine described below is used to compress the columns. The columns are just vectors that follow the basic rules of vector addition, so the aggregation procedure is simply:

$$C_n = \sum_{i=LowerBound}^{UpperBound} C_i$$

The task that remains from the above equation is to calculate the lower and upper bound. The relationship between the upper bound and the lower bound is simply that the upperBound+1 of the preceding column must equal the lowerBound of the next column (with a constraint that the first column always starts with 1).

$$1+UpperBound_{x-1}=LowerBound_x$$

Since the columns did not necessarily compress evenly, the remainders have to be dealt with and by choice are distributed evenly to the left side of the box plot. The array of upper bounds is calculated:

```
private int[ ] getXAxisArray(int numColumns, int plotXAxisSize){
    int[ ] resultAxis = new int[plotXAxisSize];
    int remainder  =numColumns % plotXAxisSize;
    int occupation  =(int)Math.floor((double)numColumns/
    (double)plotXAxisSize);
    int cursor     = 0;
        for (int i=0; i < plotXAxisSize; i++) {
            resultAxis[i] = cursor + occupation;
            cursor+=occupation;
            if (remainder > 0 ) {
              resultAxis[i]++;
              cursor++;
              remainder--;}}
    return resultAxis;}
```

This compresses the columns so that on translation the data will be plotted into a visually pleasing form. The code to add the columns is a simple loop.

At this point, the process is ready to calculate the percentiles such that the plot can be drawn. It will go column by column in the compressed histogram and calculate all the needed percentiles of each.

Each column has k number of bins. First, a sum of the column is created by iterating through the columns. (The histogram data can be accessed in a sequential and sorted way from the hash table if the keys are entered in ascending order.) A loop is started and the keys are generated by multiplying the spacing by the loop index in addition to an offset. The values are then read in bin-sorted order and tallied, and that sum is saved. Since the sum is now known, all the percentile limits can be calculated in terms of that column. For the case of the box plot with (5%, 25%, 50%, 75%, 95%), a counter threshold is obtained by multiplying that percentile by the column total. Then, in a second run of the loop, a counter starts from zero and is incremented by the bin count of each subsequent histogram cell, each time polling to see whether the latest addition to that count caused the counter threshold to be exceeded. If that happens, that bin contains the data point (though the exact number has been lost) that acts as the border bin of that percentile. For the calculated value, the average of the upper and lower limits of that bin are returned. This serves as a good approximation to that percentile. Once the first percentile is completed, the count continues until all the remaining percentiles have been completed, and then they are reported in the same way as the exemplary code below illustrates.

```
private double getArbitraryQuartilePercentageOfCol(long[ ] colArray,
double percentage{
    long sum =       sumHistArray(colArray);
    double arbQuartileValue = Math.round(percentage *(double) sum *
    1000) / 1000.0D;
    long tally =      0;
    int  currentIndex = 0;
    while ( (double)tally <= arbQuartileValue)
        {
        if (currentIndex < colArray.length) tally+=colArray[currentIndex++];
        else break;
    }
    if (tally == 0) return null;
    else return ((((double)currentIndex-0.5D)*(double)y_separation)+
    (double)y_origin);
}
```

From a speed perspective, the amount of operations per column is proportional to 2*k where k is the number of bins in the y-direction. For a given type of data, k should be relatively constant based more on the data type and accuracy desired than the number of data points. For example if in the y-direction one is binning ambient air temperature it might only make sense to report the numbers to one tenth of a degree with the full range of the scale starting from the record cold temp and extending to the record warm temp. Regardless of how many data points there are, that histogram size would stay the same. Because of this, this method will only save time compared to the standard implementation if 2*k<<n where n is the amount of data per column. In the large data limit though, n can grow without bound, so there is guaranteed to be a crossover where this implementation out-performs the standard implementation.

The speed and the size of the histogram needed are set by the precision value, which will determine how to differentiate values that are close together in value. For example, the lowest setting of precision would make all values equivalent, which would result in the most inaccurate answer possible, which would be the box plot equivalent of the trivial zero result. The most amount of precision would differentiate values to as many decimal points that were recorded and would lead to a very slow result and consumption of a huge amount of memory (potentially more memory than performing the box plot calculation with the standard algorithm.) A well-chosen precision value will result in speed, modest accuracy, and modest memory usage. Setting the precision is equivalent to setting the x-spacing and y-spacing of the histogram. Also, if the data is known to be far from zero at all points or always negative, etc. the origin can be changed (by default would be set to zero) to save space in this histogram. As it stands the origin acts as a lower bound and the histogram grows on its own with input values, but it could easily be modified that the origin is not a lower bound but a center value and the histogram can grow on both the positive and the negative side of the origin.

One more detail is the choice of hash function and the format of the key for the hash table. This choice can be customized but for representative queue depth profiler purposes the maximum queue depth rarely goes above 256. For this reason, the hash code could be:
hash=(1+y*256+x) mod the largest possible integer
Such customization improves speed and avoid collisions within the table.

The curve fitting process of step 902 is now addressed. At this point in the algorithm the box plot of the response time data vs. inferred queue depth size has been created and it has been filtered such that there is a high confidence level that the data represented is valid and has noise, artifacts or data that is statistically insignificant removed.

Three data series are created:
Data Series 1: (X,Y) series where X is inferred queue depth and y is the 95% point of the box plot data from the corresponding X value.
Data Series 2: (X,Y) series where X is inferred queue depth and y is the 75% point of the box plot data from the corresponding X value.
Data Series 3: (X,Y) series where X is inferred queue depth and y is the 50% point of the box plot data from the corresponding X value.

In one embodiment, each data series is fit using gradient descent, which those skilled in the art will recognize as being a standard optimization algorithm. The curves are fit to the equation y=exp(-b*x+a)+offset where y and x come from the data series (box plot data [response time], inferred queue depth) and b, a, and offset are fit parameters. The starting value for the parameter "a" in the above equation is 0 with a step size 0.001. The starting value for b is 0.001 with a step size of 0.0001. The starting value for offset is 1 with the step size of 1. The maximum number of iterations is 1000000, with a success threshold of 0.0001. This threshold is chosen since the theoretical curve for response time based on queue size is exponential (for a given traffic), which is a result of the well-known Erlang C formula. This curve fitter will generate three curves: one for the $95^{th}$ percentile data, one for the $75^{th}$ percentile data and one for the $50^{th}$ percentile data.

The curve fitter goes through a check that the curves are enforced to be monotonic. If that condition is not met, then all the exponential curve fittings are changed from an exponential curve fit to a best fit of a horizontal line y=offset (not taking x into consideration). This is done because downward facing curves have no physical basis in network theory and are most likely generated due to too small a data size or an artifact in the recorded traffic. If horizontal lines are resorted to (e.g., in step 910), the recommendation engine does not provide a recommendation.

The remaining analytics are completed using the fit curves: $95^{th}$ percentile, 75th percentile and $50^{th}$ percentile as well as the box plot data. The raw data is not considered in the analysis.

A straightforward algorithm examines the data to see if the final result should be a recommendation that the queue depth limit should be raised (step 903) as opposed to the remaining sub algorithms which determine a recommendation on lowering the queue depth. This algorithm performs a number of checks, each check returns a true or false. If all the checks are true the algorithm will recommend the queue depth be raised by displaying a recommendation message which in one embodiment states "The data indicates that the current queue depth limit may be too low, please raise the queue depth limit by a small increment." If any of the checks are false the sub-algorithm ends and moves on to the next sub-algorithm. The checks are as follows (NOTE—In the discussions below, the general configuration names are given in square brackets [EXAMPLE CONFIGURATION], sometimes after the hardcoded value is quoted, and can be used to tune the algorithm):

1. Is the total amount of points recorded in the histogram more than a threshold named [QD_RASISE_DATA_MINIMUM_FOR_RECOMMNED] which in one embodiment is set as 1520 data points?
2. Is the maximum queue depth recorded more than the threshold named [QD_RAISE_QUEUE_LENGTH_MINIMUM_FOR_RECOMMEND] which in one embodiment is set at 6?
3. Are all curves monotonic?
4. Is every value on the fitted curve of the $95^{th}$ percentile box plot data less than [SIMPLE_QD_FINDER_LIMIT_WHERE_WAITING_OCCURS_IN_MICROSECONDS] which in one embodiment is set at 20000?
5. Is every value on the fitted curve of the $75^{th}$ percentile box plot data less than [SIMPLE_QD_FINDER_LIMIT_WHERE_IT_IS_STILL_FAST_IN_MICROSECONDS] which in one embodiment is set at 10000?
6. For every queue depth, is every associated $95^{th}$ percentile box plot value less than [SIMPLE_QD_FINDER_LIMIT_WHERE_WAITING_OCCURS_IN_MICROSECONDS] which in one embodiment is set at 20000? (N.B. this is different from the other steps as this one is concerned with the box plot data and not the curve fit to the box plot data)

An exemplary simple queue depth finder algorithm is now described (e.g., as in step 904). This algorithm is meant to be a simple check to see if the queue depth profile is very well behaved and exactly fits into the mold of what could be called the most typical case for the a queue depth vs. response time curve. If it can be determined that the current data is the most typical case, then what is done in order to make a queue depth recommendation is straightforward and involves the fitted curves crossing some thresholds. The advantage of using this algorithm first is that if the job is simple, a simple answer can be provided and the possibility of the recommendation engine as a whole recommending an incorrect answer goes down significantly. Compared to the algorithms that may follow this one (the Cascade algorithm and the BPA algorithm), this algorithm is more robust against errors, i.e. if it is determined that the curve is typical or "simple" the recommendation will reliably result in 75% of the data being fast and only 5% of the data experiencing waiting. For such purposes, data being processed in under 10 ms is considered fast, and it is likely that data processed below 20 ms did not have any waiting either. This is not always true, but in practice it is accurate for a typical, uncomplicated setup. If it is not typical the software will redirect it to another algorithm as seen in the schematic. An exemplary algorithm for a simple QD finder is:

1. Verify that the curves were fit. If not, FAIL.
2. Load the curve that was fit to the $95^{Th}$ percentile data and get the y-value of the fitted curve that corresponds to the inferred queue depth; make sure that it is BELOW the threshold value: 5 ms [TO_BE_CONSIDERED_SIMPLE_TOP_CURVE_FIRST_POINT_IS_BELOW]; if not, FAIL.
3. Load the curve that was fit to the $75^{Th}$ percentile data and get the y-value of the fitted curve that corresponds to the inferred queue depth make sure that it is below the threshold value: 3 ms [TO_BE_CONSIDERED_SIMPLE_75_CURVE_FIRST_POINT_IS_BELOW]; if not, FAIL.
4. Now check the first five [HOW_MANY_IS_A_FEW_FOR_SIMPLE_FINDER] queue depth indices and make sure the corresponding value for the $95^{th}$ percentile and $75^{th}$ percentile are below: 8 ms and 7 ms respectively ([TO_BE_CONSIDERED_SIMPLE_TOP_CURVE_FIRST_FEW_POINTS_ARE_BELOW] & [TO_BE_CONSIDERED_SIMPLE_75_CURVE_FIRST_FEW_POINTS_ARE_BELOW]). If not, FAIL.
5. Check if all curves are monotonic by making sure the subtraction of a point with the point preceding it is always positive in all curves; if not, FAIL.
6. Start at the largest queue depth and traverse backwards, for each queue depth value check the fitted value of the $95^{th}$ percentile curve and check to see if that value has gone from above to below 20 ms (20,000 microseconds). [SIMPLE_QD_FINDER_LIMIT_WHERE_WAITING_OCCURS_IN_MICROSECONDS]. If continual lowering of the queue depth value reaches a queue depth value of 1, FAIL.
7. Starting with the value found continue to decrease the queue depth value and check the corresponding point in the fitted curve of the $75^{th}$ percentile data until a particular point goes from above to below 10 ms (10,000 microseconds) [SIMPLE_QD_FINDER_LIMIT_WHERE_IT_IS_STILL_FAST_IN_MICROSECONDS]. Record the queue depth at this point.
8. Success, return the queue depth found at step 7 as the recommendation for the maximum queue depth setting.

If the simple QD Finder is not able to come up with a result, the following Cascade QD finder is used. The Cascade QD finder looks for explosive, avalanche or more technically exponential growth with response time as the queue depth increases. The curves are guaranteed to be monotonic so it is known that all response times for a given QD are guaranteed larger than the response times at lower QD values. What this algorithm looks for is some rise in the latter half of the data and then finds the growth point with standard deviation considerations. An exemplary algorithm for a cascade QD finder is:

1. Check if the curve fitting of the $95^{th}$ percentile of the box plot exists and use this as the curve of interest; if the curve does not exist, then FAIL.
2. Check if that fitted curve has number of entries of at least 5 [FOR_SECONDARY_QD_FINDING_LOWER_LIMIT]; if not FAIL.
3. Break the fitted curve into two halves based on the x-axis which is the inferred queue depth (the front half and the back half) and take the standard deviation of each half. For example if the fitted curve had inferred queue depth data from 1-32 the front half would have the curve fit from 1-16 and the back half would have the curve fit from 17-32.
4. This step will determine if the curve has a sudden exponential or large growth break after relative flatness. Assume this exponential growth exists if the standard deviation of the second half of the curve is more than 8 times [STD_DEV_ACCEPTABLE_FOR_SECONDARY_QD_FINDING] than the standard deviation of the first half of the curve. (It is already been established that the curves cannot be non-monotonic or those curves have already been replaced with flat lines and excluded from this analysis). If this condition is not met, FAIL.

5. Loop through the list of all the y-values of the curve fitting. For each x-value (inferred queue depth) check the y-value (a response time) starting from queue depth=1 and going in ascending order. Compare that value with the expression y(x−1)+SD*2, meaning the y value of the preceding queue depth in addition to the standard deviation multiplied by a cascade factor: [FOR_CASCADE_THE_CASCADE_FACTOR]. If that value is larger than recommend (x−1) as the queue depth. If that criterion is never met after looping through all the queue depth values then FAIL.

6. Check that the queue depth recommendation is above 5 [FOR_SECONDARY_QD_FINDING_LOWER_LIMIT]; if not FAIL without returning a queue depth recommendation.

7. SUCCESS, Return Queue Depth Recommendation

If the simple QD finder as well as the Cascade algorithm have failed, it is possible they have failed because the fitted curves do not represent the underlying data accurately. To check for this and provide a recommendation in that case, a raw box plot analysis (BPA) QD finder is used. There are several reasons why the curves may not be representative. One reason is that the curve fitter is not set to handle a plateau like shape for the response time i.e. the value starts flat for several values of x and then, at a particular x (inferred queue depth), sharply rises followed immediately by another period of flatness. The curve fitting also does not accurately capture data that rises and falls in some sort of cyclic pattern. The intent of the raw box plot analysis is to capture sharp rises in the box plot data that cannot otherwise be classified as exponential. It essentially looks for changes in the derivative which seem non characteristic of the rest of the curve. The algorithm only accepts derivative changes that have some clustering with some nearest neighbors as to eliminate noise. Other smoothing is used to eliminate noise as well. An exemplary algorithm for a BPA QD finder is:

1. If the number of columns is less than 20 [BPA_MINIMUM_NUMBER_COLS_REQUIRED], FAIL. The reason behind this is that the algorithm will be looking to smooth and analyze derivative information. If only a small number of columns are recorded there is not enough data to analyze the derivative information. Also, since this algorithm is a tertiary algorithm and only activated after several other algorithms the confidence held in the data being valid is lower than when we started. Because of this, the algorithm is not given the chance to recommend lowering the queue depth for situations where the maximum recorded queue depth is already quite low.

2. Count how many inferred queue depths columns are empty, i.e., that particular queue depth row does not have any box plot information. Turn that into a percentage based on the number of columns. If that percentage is more than 60% [PERCENT_NEGATIVE_ROW_LIMIT_ANALYSIS], then FAIL without returning a recommendation.

3. Make a data series inferred queue depth vs. the $75^{th}$ percentile box plot information of the response time.

4. Smooth this data using nearest neighbor averaging where the particular point and the point's two closest neighbors are given equal weight.

5. From the smoothed data take a relative derivative which is executed simply by looking at the difference of each point and the point before it. For the front end leave that derivative value at zero.

6. Smooth the derivative data with the same nearest neighbor averaging scheme.

7. Find the queue depth with the most positive (after smoothing) derivative value.

8. Clone the array of smoothed derivative values.

9. Sort that array.

10. The algorithm has already determined the queue depth index of the largest point. To verify that this is a jump in response time and not a noise spike, the algorithm then makes sure the second largest derivative value and the third largest derivative value are at the inferred queue depth that is directly adjacent to the queue depth index with the most positive derivative value. It can do this for the $1^{st}$ nearest neighbors or do for the $1^{st}$ and the $2^{nd}$, $3^{rd}$ etc. dictated by [BPA_OFFSET_LIMIT_NEAREST_NEIGHBOR_SEARCH]. To do this the algorithm starts from the inferred queue depth value with the most positive derivative and traverses the queue depths backwards, each time checking the associated derivative value, until that value dips below zero.

11. Take that queue depth as the index where the increase starts. The point where the derivative is the largest is assumed to be the half-way point of the increase. Since this height is relative to a threshold the actual definition of "half-way" point is not critical.

12. Compare the height of the increase just determined to a threshold of 15 ms [BPA_MINIMUM_HEIGHT_DIFFERENCE]; if it is less than the threshold then FAIL without returning a recommendation.

13. Check that the queue depth value is above the threshold of 6 [BPA_MINIMUM_SIZE_OF_QUEUE_DEPTH]; if it is not FAIL without returning a recommendation. (The lower the value of the queue depth recommendation the more potential exists for mistakes. A queue depth limit that is too small would cause performance problems on a SAN. Rather than risk that happening, the algorithm should FAIL.)

14. SUCCESS: Return the recommendation which is the highest derivative value.

The term "big data" was used above, and in many embodiments, the amount of data measured and the amount of collected metric data are large enough to fall within what is called a "big data" regime. The popular teen "big data" encompasses problems in data storage and analyses where a certain analytical procedure or algorithm performed on larger data sets must take on a distinctly different form when performed on a comparably smaller data set. This change in the analytical procedure is necessitated usually by constraints on physical data storage space or time, i.e., running a particular algorithm designed for smaller data sets on larger data sets would cause unnecessarily large storage or computation time requirements. Thus, conventional approaches that may have been suitable for smaller data sets may not scale at all for big data applications such as the embodiments described here are intended to handle.

Likewise, there are many ways to visualize data, not all of which may be helpful in big data applications. The "Box Plot" approach used herein is found to be particularly useful in conveying information pertaining to the mathematical distribution of multiple large data sets so that they might be directly compared.

Figure 4:
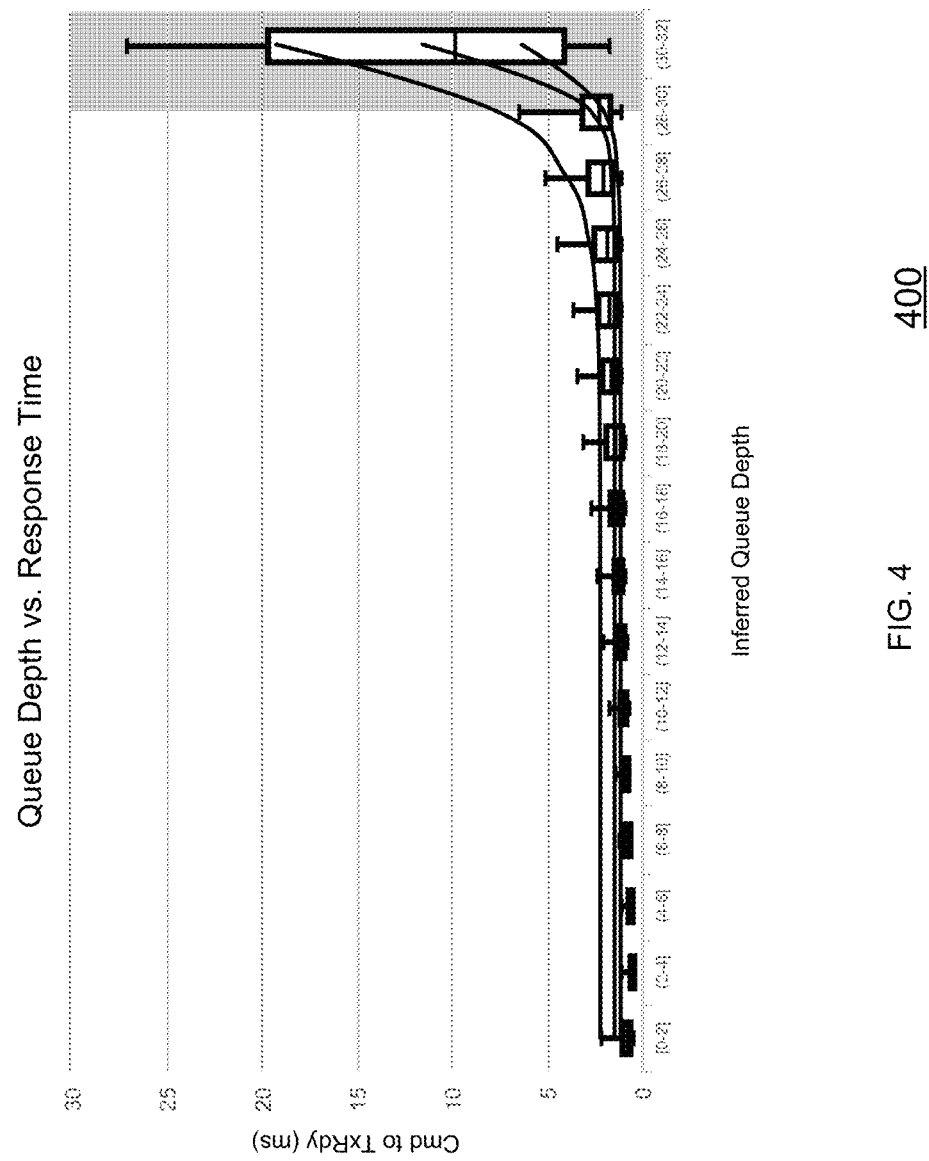
FIG. 4 is a first box plot of Queue Depth v. Response Time produced by the monitor according to the embodiment of FIG. 1.

As previously mentioned in the discussion of FIG. 3, such a box plot 303 is provided as part of GUI 301. FIGS. 4-7 depict different types of such box plots. Referring now to FIG. 4, box plot 400 illustrates one such box plot, intended to indicate what response times would look like given a queue depth setting. Note that in this embodiment, no such setting is automatically applied, but rather a recommendation is merely provided. Those skilled in the art may recognize that further automation may be achieved by automatically setting queue depth to a recommended level, either on the fly (thereby likely causing some initial disruption to the SAN) or upon the next scheduled reset/reboot/restart of the SAN. On the x-axis is the inferred queue depth, determined as detailed above. This essentially means that the possible HBA configurations are listed along that x-axis. For each potential HBA configuration, box plot 400 shows the range of response times that can be expected. For example, setting the HBA queue depth limit to 31 shows that 75% of the requests would have a response time less than 20 ms. This information is pertinent and useful to a SAN administrator who has knowledge of the pertinent applications and latency requirements. The fitted curves show the trend for continuously raising or lowering the queue depth. Finally, a recommendation is given (indicated by where the shading starts) as to the optimal queue depth setting that balances globally lowering storage array service time with keeping the expected response times within a reasonable limit. In box plot 400, the recommendation is a queue depth setting between 28-30 (the leftmost shaded setting). In some embodiments, such a recommendation is also provided via a popup message 304 just below GUI 301, as illustrated in FIG. 3.

Box plot 400 is an example of a situation that would likely be the result of a successful simple QD finder process as described above-the data show essentially uniform rise with a fairly distinct "knee" to the response time beginning just before the recommended queue depth.

Figure 5:
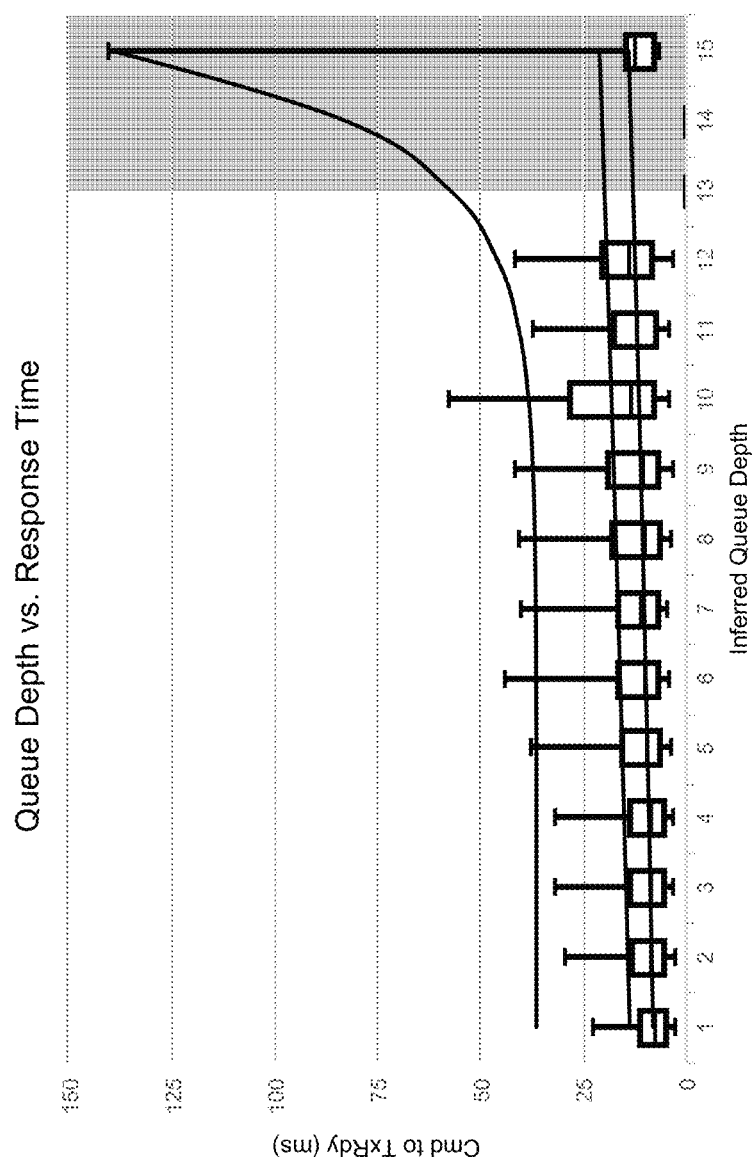
FIG. 5 is a second box plot of Queue Depth v. Response Time produced by the monitor according to the embodiment of FIG. 1.

Referring now to FIG. 5, there is shown another box plot 500 that did not fall within the bounds of what was called simple by the simple QD finder, which in one embodiment means that the data being processed in under 10 ms is considered fast, and it is likely that data processed below 20 ms did not have any waiting either, as described earlier. In box plot 500, it is viewed that the $95^{th}$ percentile curve is always above 25 ms, even for the lowest queue depth, (namely, queue depth=1). This implies that this server configuration does not follow what would be called a "most standard" setup, and thereby making a simple QD recommendation is not appropriate, as indicated by the simple QD finder failing. This is an example where the simple QD finder may well have failed, but the cascade QD finder described above, which is better suited for complex or very large server/cluster configurations, has succeeded in being able to recommend a queue depth setting: 13 in this instance (again, as indicated by the shading beginning at that inferred queue depth).

Figure 6:
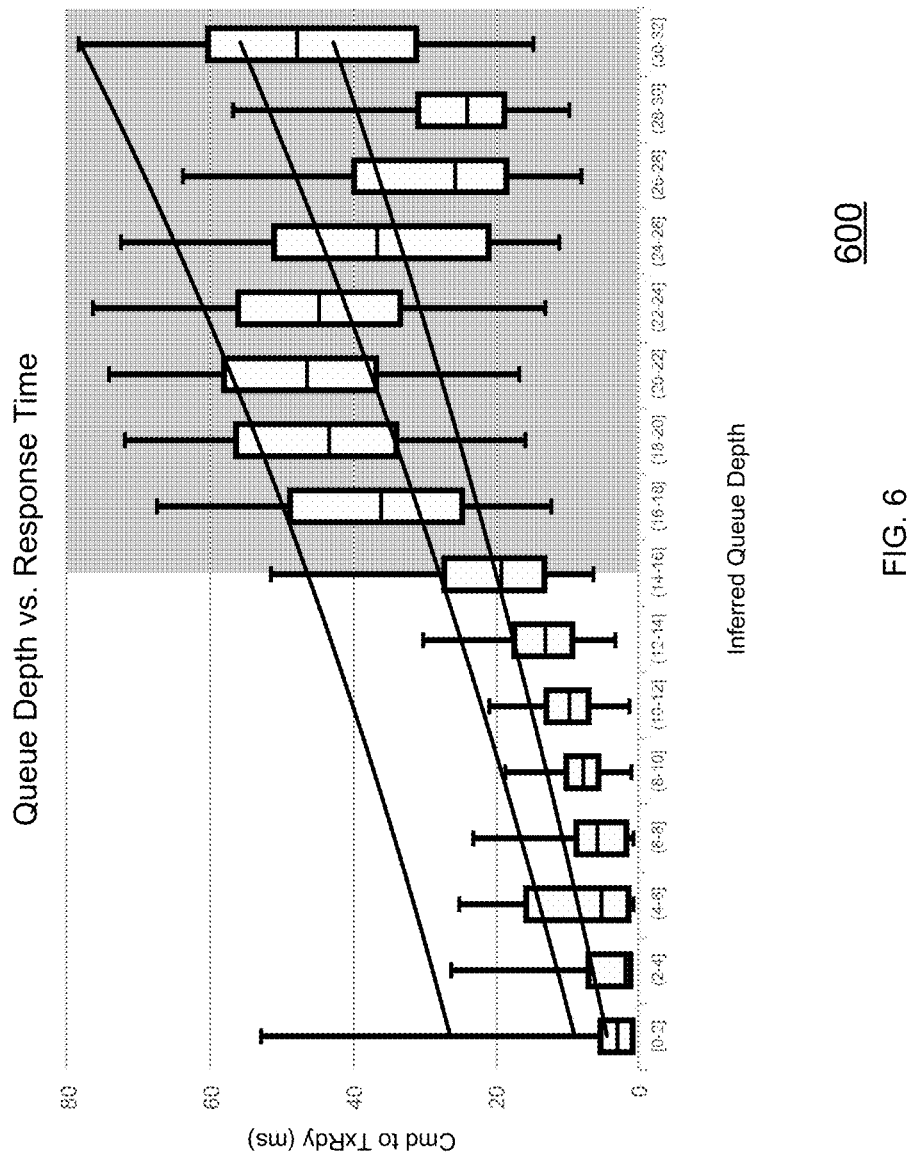
FIG. 6 is a third box plot of Queue Depth v. Response Time produced by the monitor according to the embodiment of FIG. 1.

Referring now to FIG. 6, box plot 600 represents a situation where the underlying box plot data is not well represented by the curve. It should be noted that the upper bounds on the response times with inferred queue depth peak near queue depth equals 23 then begin to fall, bottoming out at queue depth near 29. This behavior is neglected by the fitted curve since it has been required that the curve be monotonic, thus the curve has no ability to capture a rise followed by a fall. This plot is an example of a recommendation by the BPA algorithm, meaning that both the Simple SQ Finder and Cascade QD Finder have failed. Still, in this case, the BPA QD finder algorithm has succeeded with curve fitting and has returned a result of recommending the queue depth setting to be set to the 14-16 range as indicated by the shading.

Figure 7:
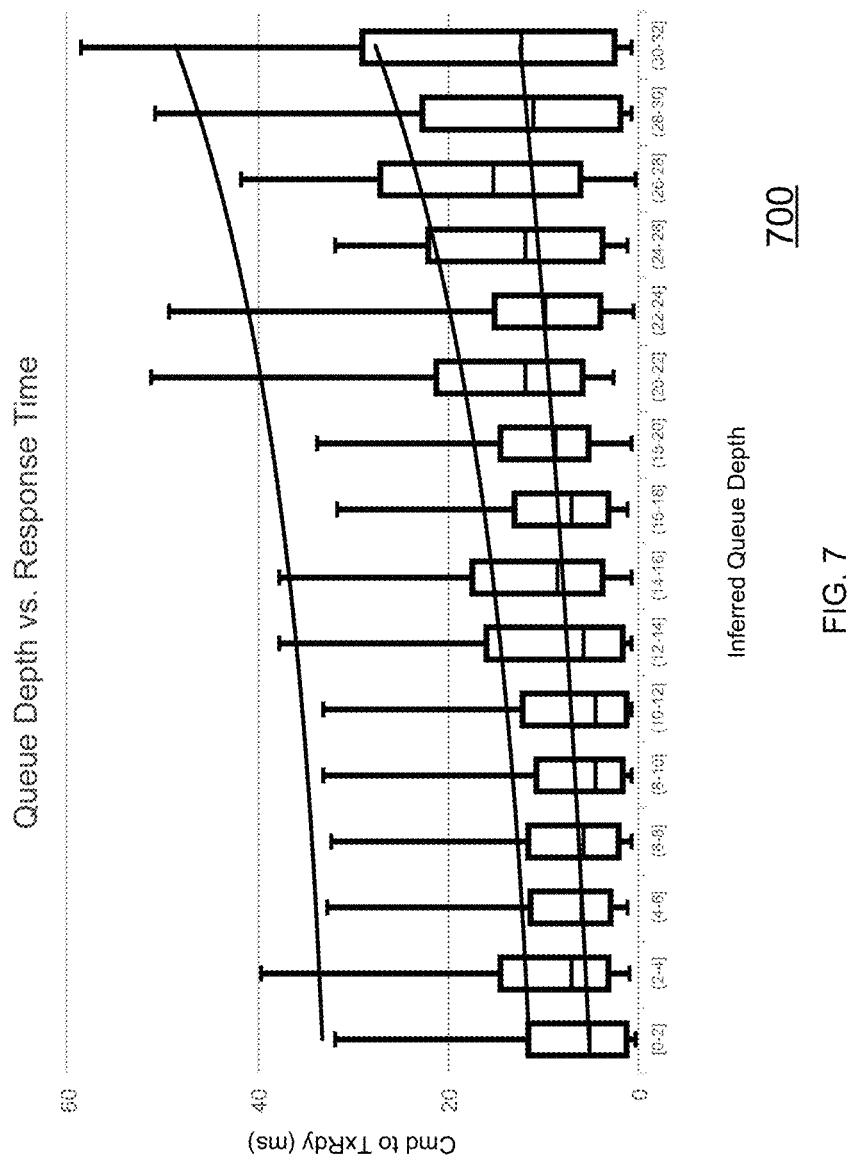
FIG. 7 is a fourth box plot of Queue Depth v. Response Time produced by the monitor according to the embodiment of FIG. 1.

In some instances, even the BPA QD finder algorithm fails, and thus none of the algorithms described above can provide a recommendation for queue depth setting. Box plot 700 of FIG. 7 illustrates that situation. In one embodiment, the box plot 700 is still provided, albeit with no shading (i.e., no recommendation being given) as to what the queue depth setting should be. Those skilled in the art will recognize that other algorithms may also be employed, as desired for any particular application, that could still provide recommendations suitable for certain circumstances.

In alternative embodiments, related techniques are used to infer operational characteristics at various queue depths in order to come up with recommended settings. For example, those skilled in the art will recognize based on the discussion herein that a more general spline curve fit, rather than an exponential curve fit, can be used. Likewise, a recorded metric known as IOPS (input/output operations per second) can be considered. In one such embodiment, additional visualization, e.g., through use of color or shading of scatter plots, allows a user to quickly see whether an optimization based on response time alone will be desirable. Referring now to FIG. 8A, there is shown such a scatter plot 800 corresponding to the box plot 400 discussed above. In this instance, consideration of an additional factor, Exchange Completion Time (ECT), may be more reflective of achieving maximum throughput than simply considering response time. In scatter plot 800, different colors or patterns are used to represent ranges of ECT. As shown scatter plot 800, a higher queue depth results in more IOPS (desirable) but is found to also impose a cost of increased ECT (not desirable). Again depending on the exact application, one of these factors may be considered more important than another, and so may drive where any recommendation threshold is located. While increasing a queue depth based on box plot 400 to a recommended setting of 28-30 appeared desirable based on the response time management, consideration of scatter plot 800 may yield a contrary picture.

Figure 8B:
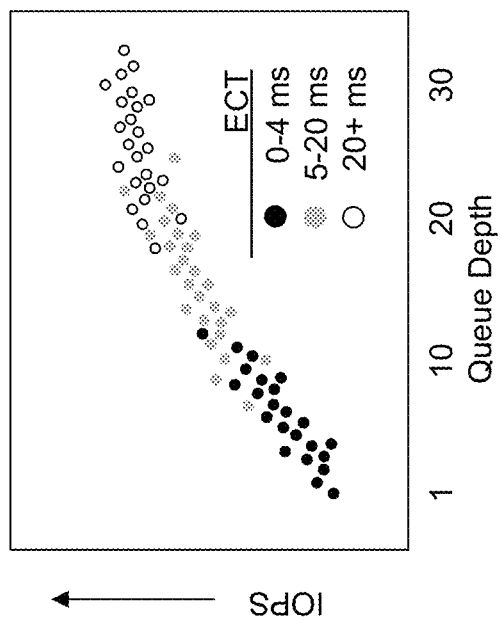
FIG. 8B is a scatter plot of $1^{st}$ Data Response time v. IOPS produced by the monitor according to the embodiment of FIG. 1.
Figure 8A:
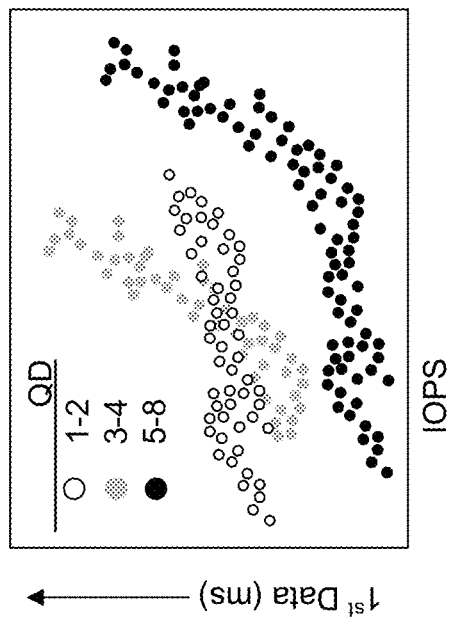
FIG. 8A is a scatter plot of IOPS v. Queue Depth produced by the monitor according to the embodiment of FIG. 1.

Scatter plot 801 of FIG. 8B shows another such visualization, this time using IOPS as the x-axis, time from command to receipt of first data as the y-axis, and using color or patterning to show inferred queue depth. Those of skill in the art will recognize other possible visualizations that may be helpful in other network settings.

It is also possible, based on the discussion herein, to analyze other parameters and optimize for other features/characteristics. For example, an alternate embodiment examines aggregate workload at a storage port or storage array to better show relationship between such workload and the number of servers sharing the same array, for instance, allowing that characteristic to be optimized. Similarly, another embodiment takes into account Maximum Pending Exchanges at the link level and ensures that Port Queue Depth is not exceeded (e.g., taking into account QFULL messages).

Yet another alternate embodiment uses more advanced filtering of the column count data performed by doing a curve fit of the counts as a function of column and looking for the counts that depart most from that fitted line. This could be a spline fit or the fit could be chosen from a list of possible functions like exponential and Gaussian.

In still another alternative, all the variations of the box plot need to be accounted for such as the different chosen percentile limits to plot. Also, common variations of the box plot such as the violin plot where the boxes get fatter with data count can be created with this same algorithm An alternative for returning the average of maximum bin limit and minimum bin limit when calculating box data points is for the lower whisker of the box plot the algorithm to return the minimum bin limit and for the upper whisker to return the maximum bin limit.

The hash functions discussed above can also be optimized based on any particular requirements for speed, size and data.

Referring now to FIG. 9 once again, there is shown an exemplary flow for overall processing of recommendation engine 121 of monitor 108 connected to Virtual Wisdom Server 109 as described above, in one embodiment. For clarity, FIG. 9 will now be discussed without all of the detail regarding how each processing step may be performed. Processing begins by applying 901 the distributed box plot generation algorithm discussed above to the pertinent data (both the data input from observations via TAP 105 and user input via dialog box 302).

Curve fitting is then attempted 902, as detailed above. If the curve fitting attempt fails, the box plot is drawn 909 with simple horizontal line fits and no queue depth recommendation. If curve fitting is successful, a "raise QD finder" routine is attempted 903. If the routine succeeds, the resulting box plot and curves are drawn 910 with a recommendation to incrementally increase the queue depth. Otherwise, processing moves on to attempt 904 the simple QD finder algorithm detailed above. If that succeeds, the resulting box plot and curves are drawn 908 with a queue depth setting recommendation (e.g., box plot 400 of FIG. 4).

If the simple QD finder attempt 904 fails, the cascade QD finder algorithm is attempted 905. If that succeeds, the resulting box plot and curves are drawn 908 with a queue depth setting recommendation (e.g., box plot 500 of FIG. 5). Otherwise, the BPA QD finder algorithm is attempted 906. If that succeeds, then the resulting box plot and curves are drawn 908 with a queue depth setting recommendation (e.g., box plot 600 of FIG. 6). However, if the BPA QD finder attempt 906 fails, then the resulting box plot and curves are drawn 909 with no queue depth setting recommendation (e.g., box plot 700 of FIG. 7).

Computing Machine Architecture

Figure 10:
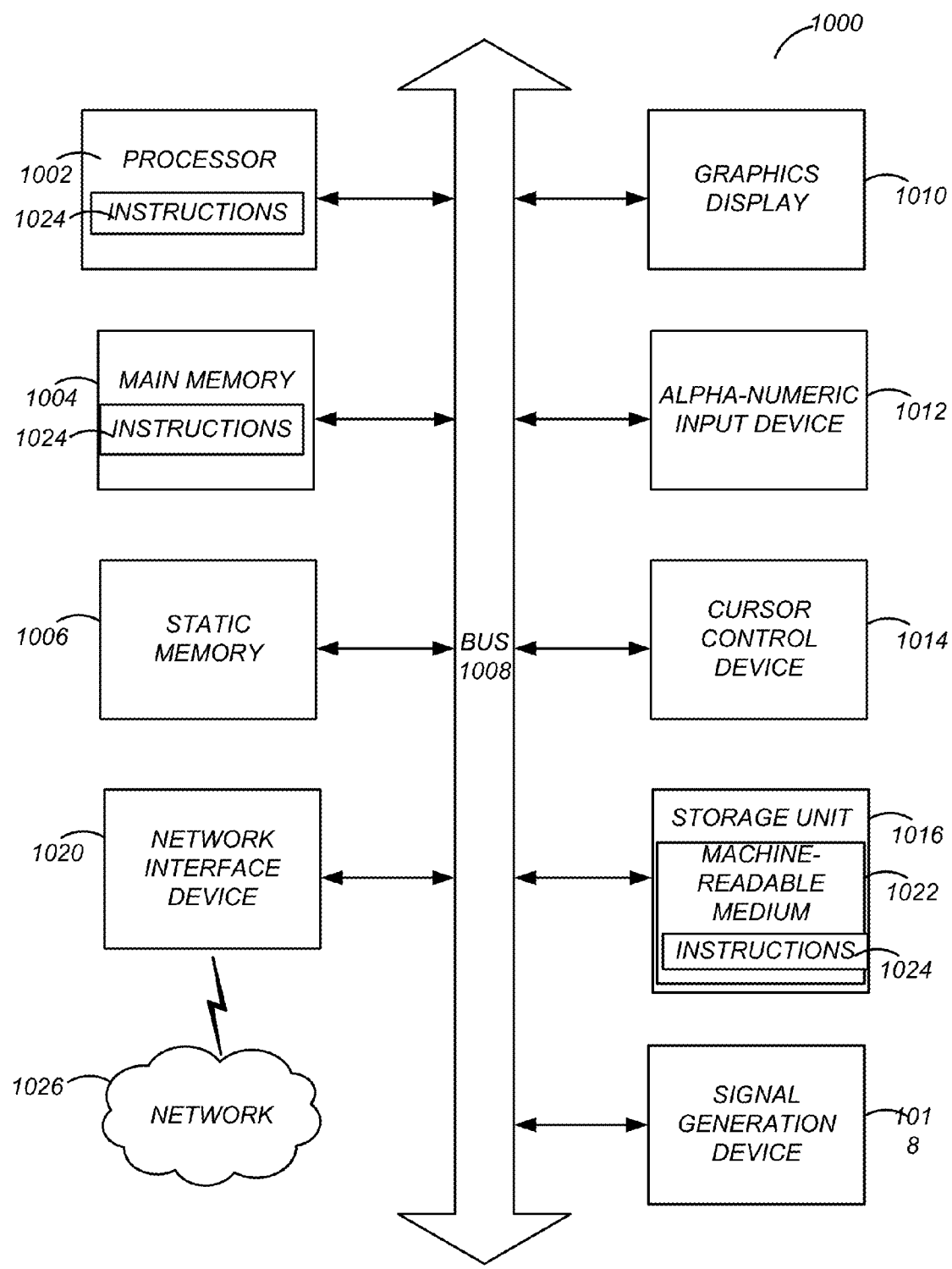
FIG. 10 is a high level diagram of an exemplary computing architecture for use in implementing the embodiment of FIG. 1.

FIG. 10 is a block diagram illustrating components of an example machine able to read instructions from a machine-readable medium and execute those instructions in a processor to perform the machine processing tasks discussed herein, such as the engine operations discussed above. Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a data store 1016, a signal generation device 1018 (e.g., a speaker), an audio input device 1026 (e.g., a microphone) and a network interface device 1020, which also are configured to communicate via the bus 1008.

The data store 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network (not shown) via network interface 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 10. Alternatively, hardware or software modules may be stored elsewhere within a computing system.

As referenced herein, a computer or computing system includes hardware elements used for the operations described here regardless of specific reference in FIG. 10 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

ADDITIONAL CONSIDERATIONS

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof It is appreciated that the particular embodiment depicted in the figures represents but one choice of implementation. Other choices would be clear and equally feasible to those of skill in the art.

While the disclosure herein has been particularly shown and described with reference to a specific embodiment and various alternate embodiments, it will be understood by persons skilled in the relevant art that various changes in form and details can be made therein without departing from the spirit and scope of the disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience. This description should be read to include one or at least one and the singular also includes the plural unless it is obvious that it is meant otherwise.

Upon reading this disclosure, those of skill in the art will appreciate still additional alternative structural and functional designs for queue depth profiling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of improving performance characteristics of a data network, comprising:
   receiving from a user a time window;
   automatically monitoring network activity to obtain recorded data sets, wherein a first recorded data set comprises response times for storage requests corresponding to a first number of pending exchanges and wherein a second recorded data set comprises response times for storage requests corresponding to a second number of pending exchanges;
   identifying, from the recorded data sets, a plurality of data sets associated with the time window received from the user;
   determining inferred queue depth settings from a number of pending exchanges associated with the identified plurality of data sets;
   generating a box plot of the identified plurality of data sets with the number of pending exchanges plotted according to the inferred queue depth settings;
   performing a curve fitting analysis on the number of pending exchanges plotted in the box plot to select, from a plurality of queue depth profiles, a queue depth profile applicable to the identified plurality of data sets;
   determining, by a processing device and based on the selected queue depth profile and the identified plurality of data sets, whether to recommend a setting for a queue depth different than the inferred queue depth setting; and
   responsive to determining to recommend the setting, presenting a recommendation corresponding to the setting.

2. The computer-implemented method of claim 1, wherein presenting the recommendation comprises providing a box plot visualization that shows the recommendation.

3. A system for improving performance characteristics of a data network, comprising non-transitory computer storage media storing programming instructions executable by at least one processor for:
   receiving from a user a time window;
   automatically monitoring network activity to obtain recorded data sets, wherein a first recorded data set comprises response times for storage requests corresponding to a first number of pending exchanges and wherein a second recorded data set comprises response times for storage requests corresponding to a second number of pending exchanges;
   identifying, from the recorded data sets, a plurality of data sets associated with the time window received from the user;

determining inferred queue depth settings from a number of pending exchanges associated with the identified plurality of data sets;

generating a box plot of the identified plurality of data sets with the number of pending exchanges plotted according to the inferred queue depth settings;

performing a curve fitting analysis on the number of pending exchanges plotted in the box plot to select, from a plurality of queue depth profiles, a queue depth profile applicable to the identified plurality of data sets;

determining, by the at least one processor and based on the selected queue depth profile and the identified plurality of data sets, whether to recommend a setting for a queue depth different than the inferred queue depth setting; and responsive to determining to recommend the setting, presenting a recommendation corresponding to the setting.

4. The system of claim 3, wherein presenting the recommendation comprises providing a box plot visualization that shows the recommendation.

5. The computer-implemented method of claim 1, wherein the selected queue depth profile comprises a queue depth versus response time pattern.

6. The system of claim 3, wherein the selected queue depth profile comprises a queue depth versus response time pattern.

* * * * *